Fig-1

July 11, 1967   T. B. WAYNE   3,330,666
RICE MILLING PROCESS
Filed Feb. 24, 1966   3 Sheets-Sheet 2

Fig. 2

INVENTOR.
TRUMAN B. WAYNE
BY Browning, Simms,
Hyer & Eickenroht.
ATTORNEYS

United States Patent Office 3,330,666
Patented July 11, 1967

3,330,666
RICE MILLING PROCESS
Truman B. Wayne, P.O. Box 13086,
Houston, Tex. 77019
Filed Feb. 24, 1966, Ser. No. 529,729
33 Claims. (Cl. 99—80)

This application is a continuation-in-part of my co-pending application Ser. No. 308,560, filed Sept. 12, 1963, now abandoned, which in turn was a continuation-in-part of my prior applications Ser. No. 43,351, filed July 18, 1960, now abandoned, and Ser. No. 81,969, filed Jan. 11, 1961, now abandoned. This invention relates to improvements in the milling of rice, and is equally applicable to long, medium and short grained varieties.

The term "milling" is used in this application to describe the removal of all or part of the bran coating and germ from the rice kernel by a process involving frictional rubbing contact between the rice kernels, and between the rice kernels and the mechanical parts of machines adapted to the said bran coat removal purpose. The milled rice kernel, commonly referred to in the trade as "white rice," consists principally of the endosperm or inner portion of the kernel which underlies the bran coat and germ, but may yet contain varying amounts of the bran coat and germ residues depending upon the degree of milling.

One of the objects of this invention is to provide an improved milled rice and a process for preparing the same. This invention has for its major objectives the providing of (1) more flexible methods for the removal of the bran coating surrounding the inner portion, or endosperm, of the rice kernels to any desired extent; (2) the substantial reduction of kernel breakage during the milling operation; (3) the providing of substantially fat-free milled and under-milled rices having superior keeping qualities; (4) greater flexibility in the attainable properties of the products of rice milling as to retention of nutritional constitutents of the bran layers, cooking qualities and physical appearance; (5) the providing, as separate by-products, of extracted rice oils produced from the brown rice directly after milling without separation of rice and bran instead of from previously separated bran, and (6) a substantially fat-free, higher protein content bran which has value in human foods as well as the usual outlet for rice bran in animal foods.

Rice with its hulls removed is called "brown rice" and contains its light-brown bran coat. This bran coat is made up of seven distinct layers which envelop the starchy interior of the kernel. After detachment from the starchy interior of the kernel, this bran coat is dominated herein as simply "bran." Most of the six outer layers and part of the seventh, or aleurone layer, are removed in the suceeding operations. Since the aleurone cells are rich in protein, and this constituent is present also in the endosperm or starchy interior major portion of the rice kernel, only about 10 percent of the protein of the hulled rice is removed in the milling process. The oil, present largely in the germ, is removed to the extent of about 85 percent, and the proportion of mineral salts is reduced nearly 70 percent.

In the conventional rice milling process of commerce the rough, or paddy, rice is first cleaned of dirt, straw and other debris and is then sent to stone or rubber roll shellers which remove the hulls and most of loosely adhering bran coat within the hull enclosure and surrounding the more adherent bran layers over the endosperm. The hulled, brown rice is then milled dry, usually in machines having the misnomer of "hullers." Actually, these "hullers" consist essentially of a horizontal, cylindrical shell having perforations against which the rice is rubbed by a rapidly revolving, tapered inner core having a ribbed surface. This surface grinding operation is carried out under time and feed rate condition which will produce the desired degree of removal of the outer bran layers from the rice kernel. This rather severe milling process breaks a substantial proportion of the whole rice grains into two or more fragments, this breakage being due to a combination of effects such as physical impact, thermal and mechanical stresses and abrasion effects on the particles. The loss of whole, head rice kernels varies with the variety, state of curing, handling in the rice dryer and subsequent storage and the severity of milling. This breakage results in a serious economic loss, as broken rice brings only about half the price of the whole head rice.

The applicant has discovered that rice may be processed by other means to not only effect more or less complete removal of the bran layers from the rice kernel while substantially reducing breakage losses, but that in one embodiment of his invention the color and stability of the processed rice may be greatly improved even when there is little removal of the bran layers. The latter results in a new rice product which retains most of the nutritional qualities of brown rice but is superior to brown rice in keeping qualities, color and cooking qualities due to the substantial removal of certain coloring matters and the oil content of the brown rice. The rice product is substantially sterile and is free from insects and viable insect eggs.

In further embodiments of applicant's invention, milled rices having any desired degree of bran removal may be economically produced either with or without the concurrent separation of rice oils, and the bran may be recovered having substantially the same composition as rice bran now produced by conventional milling processes.

Generally stated, applicant's new process comprises softening of the bran layers of brown rice which has previously been shelled and cleaned as in the conventional process, by mixing a liquid bran-coat softening agent therewith, followed by removal or detachment of the softened bran coat to any desired degree in the presence of the liquid bran-coat softening agent under conditions far less severe in impact, mechanical and thermal stresses and abrasion effects than when using the conventional dry milling "hullers." In one practical embodiment, the controlled removal of the bran coat is carried out in the above described manner and followed by a countercurrent solvent extraction process in a continuing sequence of steps for the removal of the fatty constituents in the residual germ fraction and the bran without previous separation of rice and bran. This solvent extraction process also improves the color of the extracted bran removed from the brown rice and of the residual rice kernel itself, by removal of both solvent soluble and water soluble coloring matters such as the oil and water soluble chlorophylls, anthocyans, and other coloring substances.

When the unseparated mixture of milled rice and bran, produced by detaching the softened bran coat from rice kernels as described above is subjected to solvent extraction by means of a suitable solvent such as hexane, substantially anhydrous isopropanol, trichloroethylene, ethylene dichloride or the like, the rice oils so recovered are of much lighter color, lower acidity and better refining qualities than rice oils extracted from rice bran which has been removed by conventional milling processes. This is because the actions of oxidases, lipase and possibly other oxidation and enzymic effects which are well known to set in with vigor in the removed bran, especially if its moisture content is higher than normal, are inhibited or substantially prevented when the mixture of milled rice and bran is contacted after milling in a continuous sequence of extractive steps by these substantially non-aqeuous extractive solvents, or with an azeotropic solvent containing an organic extractive solvent which may contain a smaller proportion of water within the range of from 5 to 20 percent of water in the solvent azeotrope which is also capable of extracting the fatty constituents from the milled rice and bran. A solvent system which employs a solvent azeotrope is conveniently handled in process since it tends to provide a constant boiling, uniform extractive medium containing a small percentage of water which does not impart free water to the hydratable constituents, e.g. starch, sugars, etc., of the inner aleurone layer and the starchy endosperm. Any excess of water picked up from the brown rice by condensation from air and/or from other sources is eliminated in the azeotropic distillation step during recovery of the solvent.

Applicant's solvent extraction steps which follow the milling step are not to be confused with solvent extraction of rice bran after milling and storage as is ordinarily practiced, nor the solvent extraction of other oil bearing seeds which are reduced in form by grinding, flaking, etc., to provide the thin sections and maximum surface area for efficient extraction.

The continuing sequence of steps referred to above involves passing mixed bran and rice from the milling step to an extraction step without sufficient intermediate storage period to allow time for enzymic action to proceed far enough for the oil to become oxidized or acidic to such extent that the taste and odor of the oil is impaired, as is the case when bran and rice are passed through a separating step before extraction.

The solvent extraction steps on the combined milled rice and removed bran components of the mixture are substantially different types of operations from the usual solvent extraction of the bran derived from conventional milling operations in which the bran is slurried with solvent and is extracted in successive stages while on a rotary drum filter or equivalent apparatus, after which it is discharged as a cake, and the cake is broken up and desolventized at high temperatures in a hearth, vapor transport flash type or other desolventizer which operates at relatively high temperatures.

A solvent-containing mixture of rice and bran cannot be so extracted and desolventized because the objective is always to preserve the whole structure of the rice kernels. Desolventizing, therefore, must proceed at very much lower temperatures which will not damage the head rice. Temperatures within the mass of kernels and bran are preferably maintained at about 110° F. to 140° F. to avoid loss of head rice. If further desolventizing of the bran fraction at higher temperatures is required, this must be accomplished after the rice has been separated from the mixture. The initial low temperature desolventizing step is, of course, necessary before substantial separation of the rice and bran may be effected. An alternative procedure is to effect the separation in settlers by selective subsidence or by washing the bran through the perforated baskets or screens of an extractor retaining the rice above such perforated surfaces. The rice and bran may thus be separately recovered and desolventized.

On the contrary, in the desolventizing of bran alone there are no such restrictions as to desolventizing temperatures, and it is advantageous to desolventize at temperatures between 240° F. and 300° F., or at any elevated temperature below the decomposition and charring points of the bran in order to speed the operation and reduce the size and cost of the equipment.

Extraction and desolventizing procedures before milling actually decrease the head rice yields due to increased brittleness of the kernels and hardening of the bran layer. Then when the milling step is applied the breakage which occurs reduces the head rice yield below the yield from conventional milling, and far below the improved yields of head rice by the applicant's process.

In another embodiment of applicant's process extraction with a solvent and its subsequent recovery are not used while the advantages of low stresses in milling, low breakage of kernels and flexibility in milling procedure are retained due to the presence of softening agent within the bran layers. This represents a simplification when compared with the embodiment which includes solvent extraction and recovery. Of course, extraction of rice, bran or both together may be performed at some time later if desired or extraction may be omitted. This embodiment, however, imposes certain limitations and disadvantages in comparison with the over-all results obtainable where solvent extraction and recovery are practiced. First, the decolorizing and bleaching effects of the solvent are not available. Second, the direct recovery of rice oil and high protein content bran are not possible. Third, the bran-layer softening agent unless capable of being completely evaporated, will remain in the removed bran and must be carefully chosen for its non-toxic properties. Fourth, the bran by-product is essentially the same as is produced by the conventional milling process and is subject to the usual disadvantages of quick spoilage and low market value. Fifth, the flexibility of the milling operation and the quality of the final rice products are somewhat reduced.

The brown rice starting material in any embodiment of this invention may be hulled and cleaned rough or paddy rice, or rough or paddy rice which has been parboiled and dried prior to removal of the hull. Either source of brown rice is satisfactory although that derived from rough or paddy rice yields a clearer white rice product than that derived from brown rice which has been parboiled sufficiently to drive much of the bran layer into the endosperm. The rice may be of any grade desired, for example fancy head rice, second head rice, or more extensively broken kernels. When maximum oil recovery is desired stone bran from the shelling or dehulling step may enter the process with the brown rice.

Any non-toxic, water or oil soluble or emulsifiable liquid bran-coat softening material which when used as herein described and defined has the property of wetting, dissolving, penetrating into, becoming miscible with and/or attacking the complex structure of oils, proteins and/or carbohydrates present in the layers of bran coat on kernels of the rice without causing significant breakage or damage may be used as a bran-coat softening agent, with the exception of free water under certain circumstances. For example, the kernels of brown rice are so easily affected by either pure water, or water containing such small proportions of salts as are normally present in domestic water supplies, that it is impractical to soften the bran coat on rice with such free or available water to an extent which will substantially improve the ease of milling without causing moisture checking of the rice, and thus increasing the breakage of rice kernels during the milling process.

However, if the bran-coat softening agent has, in addition to free or available water, another component or components of kind and proportion such that the agent as a whole may have sufficient softening action on the bran coat without subjecting the rice to free water in excess of 1 percent of the weight of the rice, such agent may be used to soften the bran coat in small enough quantity that the action of the water will not penetrate the endosperm sufficiently to cause adverse effect thereon. Conveniently the water can be limited to 1 percent of the rice weight by limiting the agent containing free water and another softening component to a total maximum of 1 percent of the weight of the rice.

The term "liquid bran-coat softening agent" is used in this specification and in the appended claims to include all non-toxic liquids and solids which when applied to the brown rice kernels as sufficiently liquid solutions, emulsions or relatively fluid gels and which when used within the proportions and range of temperatures herein described have the property of wetting, dissolving, penetrating into, becoming miscible with and/or attacking the complex structure of oils, proteins and carbohydrates in the bran layers. It especially includes non-polar liquid materials, such as highly refined mineral oils; predominantly non-polar materials, such as higher fatty acids, and esters of glycerol, glycols and polyglycols with higher fatty acids; dually polar, non-polar organic materials having a hydrophobic (lipophlic) and a hydrophilic group or groups in the molecule, such as soaps, sugar alcohol esters of higher fatty acids, amido compounds of higher fatty acids, glycols having three or more carbon atoms in the molecule, and polyglycols; very small amounts of aqueous solutions of alkaline materials which have a saponifying effect on fatty components and a solubilizing effect on certain protein constituents of the bran, such as hydroxides and carbonates of ammonium and the alkali metals; very small amounts of aqueous solutions of neutral salts which attack and render soluble certain proteins of the bran layer, such as chlorides and sulfates of ammonium and the alkali metals; and dilute solutions of acids which are non-toxic in the small proportions present but are effective to attack and solubilize proteins, such as hydrochloric, sulfuric, phosphoric and citric acids.

When water is a solvent or dispersant for any of the above agents, it is preferably used in only sufficient quantity to impart the required fluidity to the resulting solution, emulsion or gel containing the bran-coat softening agent so that it will penetrate the bran coat without substantially entering the underlying endosperm. However, it is not the water which is firmly bound in a viscous solution or an emulsion or gel which causes damage to the endosperm, and such bound water may be present in excess of the above stated limit of 1 percent of free water without damage to the rice kernel provided that the said solution, emulsion or gel does not release free water in excess of this approximate limit.

A relatively large number of agents of organic nature selected from the groups comprising the soaps of fatty acids and various acid esters of glycols, polyglycols, the sugars, sorbitol and similar substances will with water form a varitey of viscous solutions, emulsions and gels in which the water is sufficiently bound to prevent the release to the rice by absorption or other means of the deleterious free water. These softening media when dispersed on the bran coat will penetrate and wet it sufficiently to soften the bran layers and will not immediately penetrate into the endosperm and damage it in the manner which occurs when an attempt is made to use water.

The solutions of electrolytes, however, are more difficult to control when used in sufficient quantity to reach the approximate limit of 1 percent of water which is relatively more free to penetrate and damage the endosperm. Therefore, they are best used in relatively small quantities as are hereinafter defined. However, if the solutions of these electrolytes, e.g., alkalis, acids and salts are used in the forms of the more viscous emulsions or preferably as gels, their penetration is easier to control and damage to the endosperm may be avoided even where larger proportions of agent are employed. Such gels in the presence of alkalis, acids and salts are conveniently prepared by dissolving them in water and thickening their solutions with organic gelling agents such as starch, vegetable gums and other food grade thickeners, or by the use of inorganic gelling agents such as purified bentonite, colloidal silica and various other non-toxic inorganic aluminum and silicon compounds with sodium, calcium and magnesium.

Various recognized test procedures known to those skilled in the art may be used as objective tests for determining the free water content of an aqueous softening agent to determine its suitability and amounts permissible to be used.

One simple satisfactory test for determining the stability of such water dispersed bran-coat softening preparations is to mix an excess of the preparation with brown rice, for instance in the proportions of 50 grams of the agent with 500 grams of brown rice, in a large test tube or a beaker and warm the mixture in a water bath at 120° F. for 4 hours. The mass is then transferred to a basket type of laboratory centrifuge which is fitted with a 14 by 16 mesh woven screen of perforated plate and is centrifuged at 2000 r.p.m. for 5 minutes. The excess of the agent will be removed by the centrifugal force and the treated brown rice is recovered from the centrifuge basket. The liquid dispersion containing the excess of agent is collected and centrifuged in a tube-type centrifuge to determine the free water or electrolyte solution content of the excess agent. It should not exceed 10 percent of the total volume of the gel.

The centrifuged brown rice is then milled in a laboratory McGill mill in accordance with the conditions of the standard procedure for determining yields which is used in the rice milling industry. The milled rice is collected, weighed and screened to obtain the percentages of whole head rice and broken rice respectively. The milled rice is visually examined for undesirable penetration of the agent into the endosperm.

The above test procedures are used only where brancoat softening agents are dissolved, emulsified or gelled in water. Such tests are unnecessary when substantially non-aqueous agents are used as such or when dispersed in non-aqueous solvents.

The preferred bran-coat softening agent of the present invention is a material selected from the group comprising non-toxic oils; esters of glycerol, propylene glycol, polypropylene glycol and sorbitol with fatty acids; soaps of fatty acids; propylene glycol; polypropylene glycol; aqueous solutions of hydroxides and carbonates of ammonium and alkali metals; aqueous solutions of non-toxic neutral salts of ammonium and alkali metals, and aqueous solutions of hydrochloric, sulfuric, phosphoric and citric acids, and mixtures thereof wherein the water content does not exceed 1 percent of the weight of the brown rice.

Highly refined mineral oils and edible vegetable oils such as rice oil, corn oil, cottonseed oil, etc. are specific examples of non-toxic oils. When the milling step is followed by a solvent-extraction step, as described in one embodiment below, recycled rice oil from the process is a very satisfactory bran-coat softening agent; and since it is readily available at substantially no cost, there is little reason to use any other material. The oil may contain or be dissolved in a suitable organic solvent. Naturally occurring or synthetic mono-, di-, or triglycerides of fatty acids may be used.

It will be seen that softening of the bran layer may proceed by different mechanisms according to the type of bran-coat softening agent used. The naturally oily bran layer may be softened by absorbing additional non-toxic oil or synthetic glyceride and so become oil soaked to a desired degree.

Bran-coat softening agents, such as propylene glycol; polypropylene glycol; fatty acid esters of sorbitol, propylene glycol, and polypropylene glycol; and soaps of higher fatty acids, which have both hydrophobic and hydrophilic groups in the molecule, have surface-active properties and operate upon a somewhat different principle. The bran layers are oily and normally contain considerable proportions of water. Bran-coat softening agents in the last-mentioned group having fat-oriented as well as water-oriented radicals or groups thus easily penetrate into the bran layers and soften and loosen the bran-coat for this reason.

Aqueous solutions of alkaline materials, such as the hydroxides and carbonates of ammonium, sodium and potassium, have a saponifying effect on the fatty material in the bran layers and a solubilizing effect on certain protein constituents. Non-toxic neutral salts of the alkali metals and ammonium and dilute aqueous solutions of the acids also attack and render soluble certain of the proteins and thus afford another mechanism of altering and softening the bran-coat layers which are rich in fatty substances, proteins and mineral salts. The bran-coat layers thus affected and subsequently detached in milling will yield their extractable oils to a suitable solvent. Many of such additives having bran-layer-softening properties in the presence of water are totally removed by evaporation or volatilization in later steps of desolventizing or drying of the bran and milled rice.

The bran-coat softening agents which are not truly soluble in organic solvents may be emulsified therein during an extraction step immediately after milling, when such extraction step is used, and usually tend to selectively wet and to be absorbed by the bran coating. Thus they are removed from the solvent system in each cycle and remain in the bran fraction. If their tendency to emulsify instead of dissolve in the less polar solvents and solvent mixtures is due to their water content, and possibly also due to organic solvent-insoluble substances, such as inorganic salts, which are preferentially absorbed and removed in the bran layers, the solvent-soluble fractions which remain will be found in the recovered fatty oils where they may remain or can be eliminated in a subsequent oil-refining step.

Thus, it is possible to use small proportions of bran-coat softening agents of inorganic or organic nature in aqueous solution or suspension provided that the quantity of water is insufficient to cause moisture absorption to a substantial degree beyond the seven layers comprising the bran-coat and thus affect the starchy endosperm. When aqueous solutions are used, the quantity must be restricted so that the solution does not penetrate into, wet, swell and discolor the rice endosperm. If penetration through the bran layer occurs, excessive removal of endosperm will occur during the milling step and there is great danger of causing moisture checking and breaking of the rice grains. The preferentially water-wettable or water-soluble softening agent and all or part of the water in which they are dissolved or suspended will remain absorbed in the bran unless an azeotropic system exists which removes in the desolventizing and solvent distillation steps part of the water thus introduced.

The ammonium compounds are especially desirable bran-coat softening agents since many of them are completely removed by heat or are partitioned in the solvent system with the high molecular anion dissolving in the solvent and the ammonium radical remaining in the water-containing bran settlings from which it is later volatilized when the bran is recovered, desolventized and dried.

The glycerol esters of higher fatty acids may be used in the form of crude or clarified vegetable oils such as rice oil, corn oil, cottonseed oil, etc., if desired. When the step of extracting unseparated bran and rice with a suitable solvent after milling, as described below, is used, recycled rice oil or a solution of rice oil in a suitable solvent is a very satisfactory softening agent and is preferred because it is readily available at substantially no cost.

Preferred values and ranges given herein for variables such as times, temperatures, proportions, degree of milling, etc., are intended to be optimum and not limiting except as specifically so recited, and except for maximum water content relative to rice weight in bran-coat softening agents. In most cases the process will be workable outside the preferred ranges given, although usually attended by some gradual decrease in beneficial results or increase in cost or the like as the preferred ranges are exceeded. Also, in most cases they are somewhat interrelated or are dependent on other conditions, as the holding time for bran-coat softening varies with temperature, nature of the softening agent, etc.

In general, the bran-coat softening agent should be used in proportions of about 0.25 to 5.0 weight percent based on the weight of brown rice when a non-aqueous bran-coat softening agent is used. These quantities apply to the total liquid bran-coat softening agent, including any non-aqueous medium in which an active reagent is dissolved in order to obtain proper distribution and wetting of the rice. When an undiluted mineral oil or vegetable oil is used, the quantity of oil required is in the range from about 0.25 to about 1.0 percent; while from 2.0 to 5.0 percent of a solution of the same oil in a suitable solvent may be desirable according to the degree of dilution. However, when extracted rice oil is recycled, proportions of from 2.0 to 5.0 percent thereof either undiluted or in the form of a solution of the oil in a suitable solvent having a strength of about 10 percent oil may be applied without detriment to brown rice. The proportions of solvent soluble bran-coat softening agents and non-aqueous solutions thereof are not critical if the rice and bran are to be solvent extracted subsequent to the milling operation in accordance with the presently preferred embodiment.

For strong alkalis, such as sodium and potassium compounds, it is practical to add from about 0.25 to 1.0 weight percent of an aqueous solution containing about 10 percent to 50 percent of such ingredient. For ammonia, about 0.25 to 1.0 weight percent of commercial aqua-ammonia should be used; for ammonium carbonates, about 0.25 to 1.0 weight percent of an aqueous solution containing up to 20 percent of ammonium carbonate since this material volatilizes easily in the finishing steps; for salts, acids, etc., from about 0.25 to 1.0 percent of aqueous suspensions or solutions of these materials containing up to about 10 percent of the salts, acids, etc., are desirable while 0.25 to 1.0 percent of an aqueous solution of a surface active agent such as a sorbitol ester of a higher fatty acid, containing 0.1 percent to 0.5 percent of the surfactant is sufficient.

In all embodiments the first step is the treatment of the brown rice with a small quantity of an agent, preferably within the range of 0.25 to 1.0 percent by weight when agents having free or available water are used, and in no event in an amount in which the water content exceeds 1 percent of the rice weight, or from 0.25 to 5 percent by weight of a substantially non-aqueous bran-coat softening agent, which is capable of penetrating and softening the pericarp and aleurone layer which comprise the bran coat. Larger proportions of such non-aqueous softening agents may be used without departing from the principles of this invention, although without additional benefit, or a substantial proportion of fresh solvent or oil-containing solvent may be recycled to treat the incoming brown rice. However, unless a recycled solvent stream is used, the employment of larger quantities of the bran-layer softening agent or combination of agents either places an unnecessary load on the extraction and solvent recovery systems; or in procedures where solvent extraction and recovery are not employed the use of excessive quantities of softening agents results in too much of such materials appearing in the bran by-product and needlessly increases the processing costs. Where aqueous solutions of suitable reagents are employed, the use of excessive quantities may result in water penetration beyond the aleurone layer with resultant checking and breakage of head rice and added difficulties in expelling the excess water by a drying operation. However, if the wet milling of the rice in the presence of a quantity of aqueous solution in excess of the preferred 0.25 to 1.0 percent on the weight of brown rice precedes the steeping, gelatinizing and drying of the processed rice as a preliminary step in the preparation of further processed rice products, no objections to such excess may be raised other than the necessity for quickly dehydrating the recovered bran to prevent spoilage from oxidation and enzymic actions.

Any of the embodiments of this invention may be advantageously employed in connection with the processes disclosed in U.S. Patents 3,085,012 and 3,085,013 relating to a precooked, dehydrated rice product and processes for the preparation thereof. The brown rice is processed to any desired stage of milling, separated from any solvents used and any resulting bran, is desolventized where required and without further processing is immediately sent to the steeping or cooking operations described in either of the referenced patents. This obviates the necessity for any finish drying, polishing and grading operations on the rice which is to enter further processing instead of being finished and packaged for the trade.

Application of the bran-coat softening agent to the brown rice may be accomplished in any of several types of mixers or screw conveyors which will not cause breakage of the brown rice kernels during the mixing operation. The bran-coat softening agent should be distributed over the brown rice kernels as uniformly as possible. The temperature of the agent should be selected to insure liquidity and sufficiently low viscosity to allow its ready penetration into the bran layers and germ of the brown rice kernels. A temperature range of from 90° F. to 140° F. is sufficient to render any of the above-mentioned reagents suitable for use. Obviously, the lower temperature range of 90° F. to 120° F. is suitable for the predominantly oily or lipophilic reagents such as low viscosity oils and also for the predominantly hydrophilic substances which are dispersed in water. The agents of predominantly waxy, lipophilic nature such as the fatty acid esters of the alcohols, sugars and the polyglycols of higher molecular weight and viscosity will require higher temperatures for proper liquefaction, and the upper part of the temperature range to 140° F. may be used advantageously.

Although the proportions of bran-coat softening agents used per unit weight of brown rice are small, and their temperature effects throughout the rice kernel are small, it is nevertheless desirable to avoid large temperature differences which may cause checking (cracking) of the brown rice kernels. Thus, if the brown rice is received at temperatures of 60° F. or below, it will be preferable to select a bran-coat softening agent which may be applied at 90° F. to 100° F. and the mass gradually warmed to 90° F. to 110° F., whereas if the rice is received at a temperature of 90° F. the application of an agent having a temperature of 140° F. is unlikely to produce sufficient thermal shock to cause checking.

The time required for sufficient penetration of the agent into the bran coat is also affected by the nature, viscosity and temperature of the agent. If it is a lipophilic agent which is dissolved in sufficient concentration in a hydrocarbon solvent for fatty materials, the penetration into the bran coat and germ is rapid and complete within a few minutes. However, if a relatively viscous oil is used without dilution and the mass of oil and rice is relatively cold, i.e., between 70° F. and 100° F., the penetration may require several hours. The time required for accomplishing the required penetration and softening of the bran coat and germ without significant effect on the underlying endosperm (which is a danger when using an aqueous softening agent) may thus range from a few minutes to four hours, or even longer. In actual operation it has been found that using undiluted rice oil as the agent in quantity of 1½ percent of the weight of the rice and allowing six hours for softening, has produced satisfactory results. However, it is preferable to select an agent and conduct the bran coat softening operation at a temperature which will produce the desired effect within a holding period which does not exceed two to four hours.

A sufficient degree of softening of the bran coat is indicated when it may be easily removed from the brown rice kernel by scraping with the fingernail. The softened bran coat is thus easily removed, exposing the white endosperm. The milling action in the process equipment need not be more severe than this simple test for the degree of bran softening. The so-called "fingernail" test is, therefore, quite indicative of how the kernels tend to remain unbroken when the bran is milled off in this softened state.

Other objects and advantages of this invention will appear from the detailed description, taken in connection with the accompanying drawings, in which.

Figure 1:
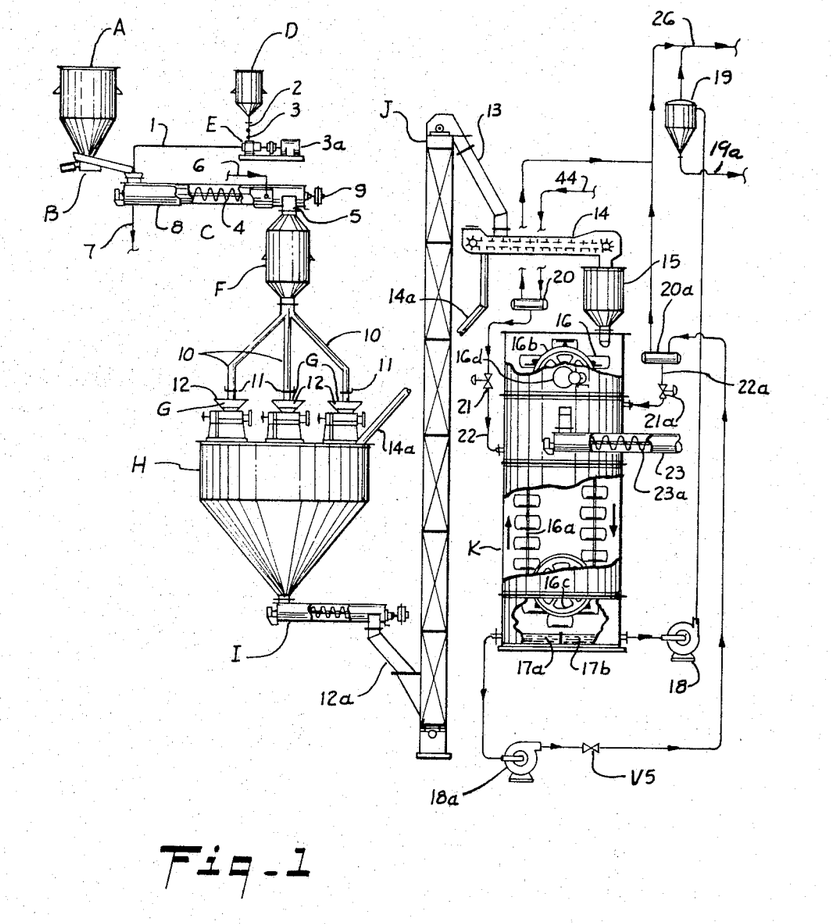
FIG. 1 is a part of a flow diagram illustrating an embodiment of this invention.
Figure 2:
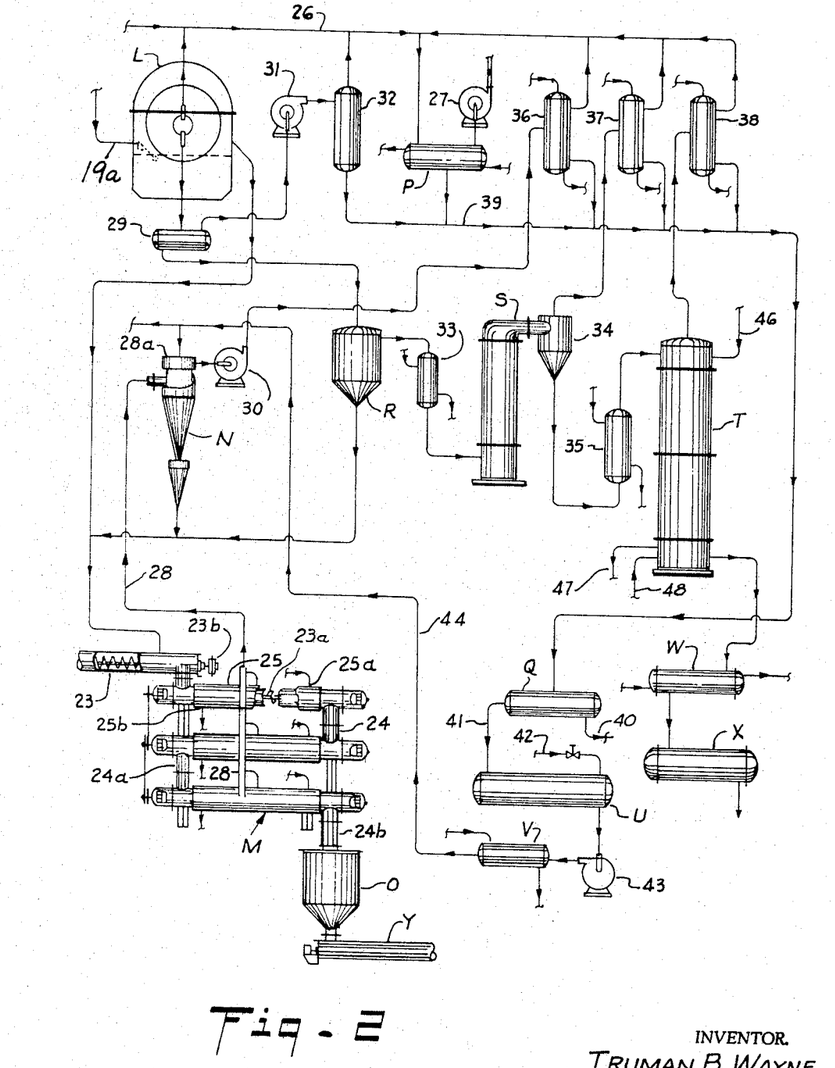
FIG. 2 is a continuation of the flow diagram of FIG. 1 extending to the right of FIG. 1.

FIGS. 1 and 2 make up a flow diagram of one embodiment of a complete process, inclusive of pretreatment of the brown rice with a bran-coat softening agent, milling, solvent extraction, solvent recovery, rice oil recovery and recovery of the extracted, desolventized mixture of milled rice and bran, and illustrates the principal apparatus in proper process sequence.

In the schematic flow diagram of FIGS. 1 and 2, the combination of apparatus elements shown includes a storage hopper A from which brown rice, or brown rice admixed with bran removed in the preceding stone or rubber roll shellers, is fed by means of vibrating feeder B, or other suitable feeder device, into mixing screw conveyor C where it is mixed with a relatively smaller volure of a bran-coat softening agent from pipe 1. The softening agent is contained in tank D from which it is withdrawn by proportioning apparatus E, operated by a motor 3a, through pipe 2 and shut-off valve 3 when the latter is in the open position.

The brown rice entering mixing screw conveyor C is conveyed by means of mixing scroll 4 to the discharge end 5 of the conveyor. Scroll 4 is equipped with mixing paddles or cut and bent lifter flights to effect thorough mixing of the bran-layer softening agent with the brown rice. The rate of penetration of the softening agent may be increased by warming either the agent or the mixture of rice and agent to a temperature within the range of 90° F. to 140° F. Mixing screw conveyor C is provided with warming jacket 8 through which steam or warm fluid may be circulated by means of entry nozzle 6 and discharge nozzle 7. Scroll 4 within the mixing conveyor is rotated as speeds between 30 and 150 r.p.m. by means of conveyor drive 9 which consists of a motor and speed reducer.

The brown rice, now treated uniformly with the bran-coat softening agent may be discharged through outlet 5 into holding tank F which provides both surge storage and additional retention time before the treated rice goes to the hullers G through one or more chutes 10, each having a slide gate 11. Holding time may be from a few minutes up to four hours or more. The flow of rice to the hullers is controlled by the level in huller hopper 12 but may be shut off from any of the hullers by closing slide gate 11. The hullers shown in the flow diagram are the conventional Engelberg hullers which are used in rice mills for the dry milling of brown rice. Their action is greatly assisted, and the yield of head rice from them is materially improved through the use of the bran-layer softening agent above mentioned. Other forms of milling equipment such as the pearling cone, or improved apparatus such as that described in applicant's prior application Ser. No. 43,351, now abandoned, or in connection with FIG. 3 may be used instead of the conventional hullers.

The hullers are operated without aspirators to separate the millings and the mixture of milled rice and bran is allowed to drop by gravity into receiving bin H. Of course, other means of handling the milled rice and bran mixture such as receiving the output from the hullers in screw conveyors, troughed belts, Redler conveyors or bucket elevators are also contemplated as equivalents.

The vertical, moving basket type of solvent extractor is shown in the flow diagram as apparatus K, although other multistage extraction apparatus such as rectangular and horizontal basket type extractors, and in fact other types of countercurrent or combinations of concurrent and counter current extractors which provide substantially complete miscella filtration within the extraction apparatus, are entirely suitable. The apparatus K has baskets 16, mounted on a conveyor 16a, passing over upper and lower wheels 16b and 16c, the upper one being driven by a geared motor 16d, so that the conveyor is moved in the direction of the arrows. Because of the height of the vertical, moving basket type extractor, the rice and bran mixture drawn from bin H by means of feed screw I is delivered by a chute 12a to bucket elevator J and elevated to extraction apparatus K. Obviously a Redler or other form of conveyor could be substituted for both feed screw I and elevator J and perform the feeding and elevating functions above mentioned. Also, feed screw conveyor I could be positioned to feed directly from bin H into extractor K and the overflow from conveyor 14 elevated back into bin H.

The rice and bran mixture is discharged from elevator J through spout 13 into feeder conveyor 14 which delivers the mixture to filling device 15 which fills the extractor baskets 16 each of which is perforated to drain into the basket immediately below it. The overflow of material delivered by feed conveyor 14 is returned by means of a chute 14a or other means to bin H. Extractor K is a commercially available apparatus to which no inventive claim is made, per se, by the applicant, so the following brief description of its construction and operation will be sufficient to explain its process function.

The baskets 16 for the first extraction stage, or the second extraction stage if extraction has been effected in a preceding apparatus, are filled at the top of the extractor while traveling in upright position under filling device 15 after being emptied of extracted mixture leaving the final extraction stage by means of a suitable basket inverting mechanism. Miscella from a preceding or succeeding extraction stage is applied to the mixture of rice and bran as it travels downward and filters by gravity from the basket to its next succeeding basket in its downward travel. The strong miscella then collects in compartment 17b of the miscella receiving tank and is continuously pumped by means of pump 18 to surge tank 19 ahead of miscella filter L, which may be of any type desired. The baskets descend and turn around the lower elevator wheels and rise towards their discharge point at the top of the extractor. At a point near their change from a vertical to a horizontal course across the top of the extractor, the contents of the baskets are sprayed in countercurrent flow pattern with fresh solvent from the solvent recovery plant. Again, the solvent percolates downward through the successively rising baskets and finally enters compartment 17a of the miscella receiving tank where it is picked up by pump 18a and returned to the descending column of extraction baskets in concurrent flow, as previously described. Item numbers 20 and 20a are small solvent and weak miscella surge tanks, respectively, which are equipped with regulating valves 21 and 21a in their discharge pipes 22 and 22a which deliver solvent and weak miscella, respectively, to the two extraction stages within extraction apparatus K. The temperature of the solvent and the miscellas introduced into the rice and bran mixture in the baskets 16 of extraction apparatus K is preferably maintained below the boiling point of the solvent or 160° F., whichever is the lower, in order not to subject the rice to thermal shock which may cause breakage.

The extracted milled rice and bran mixture, now partially drained of free solvent, is discharged from the extraction apparatus into closed screw feeder 23 which delivers the extracted material to the initial solvent recovery stage of desolventizer M. Desolventizer M as illustrated comprises a series of three jacketed, closed screw conveyors equipped with cut and bent flight scrolls 23a alike or similar to those in C, the screw being driven by a motor 23b, which agitate the mixture in its movement to discharge chutes 24, 24a and 24b of the successive stages of the disolventizer. Each stage is equipped with a jacket 25 having inlet and outlet connections 25a and 25b through which steam or heated fluids such as water, oil or other medium may be circulated to heat the milled rice and bran mixture and expel the solvent through the respective duct connections from the several desolventizer stages to main solvent vapor pipe 28 which delivers to cyclone collector N. Collector N is fitted with scrubber 28a to remove fine dust which escapes the cyclone. The dust from collector N is returned to feed screw conveyor 23. Exhauster 30 draws solvent vapor from the desolventizer apparatus and compresses it for delivery to condenser apparatus which will be described more fully in connection with the solvent recovery system. The temperature of the rice and bran mass within the desolventizer M preferably is maintained within the range of 110° F. to 140° F. to produce the desired degree of solvent removal and also avoid breakage of the rice kernels.

The rice and bran mixture is discharged from the desolventizer M through discharge chute 24b into surge hopper O from which it is delivered by conveyor Y to air separation, screening and rice polishing operations which may be accomplished in conventional rice mill installations or by other means which are not, per se, a part of this invention. While the horizontal screw type of desolventizer has been illustrated in FIG. 2 and used in the foregoing description, other types of desolventizers are contemplated as equivalents.

The solvent and rice oil recovery systems are interrelated operations, as will be observed from the descriptions which follow. Each component of these systems is connected by a suitable duct or pipe connection to the main solvent vapor header 26 which acts as a vapor pressure equalizer and vapor collector which delivers solvent vapor to refrigerated condenser P where solvent and water vapor mixtures are condensed and delivered to solvent and water separator Q and noncondensable gases are vented to the atmosphere by means of exhauster 27.

Miscella filter L discharges its filtered strong miscella to miscella receiving tank 29 by means of the vacuum produced by pump 31 which discharges its vapors to the condenser 32 which acts also as a solvent vapor separator. The wet solvent flows from condenser 32 to separator Q. The filtered miscella in receiving tank 29 is delivered to filtered miscella storage and settling tank R from which settlings are returned to screw feeder 23 and the fully clarified, settled miscella is delivered through preheater 33 to evaporator S and to separator 34. The recovered oil from 34 is passed through preheater 35 and into stripping column T. Vapors from separator 34 and stripping column T are sent to their respective condensers 37 and 38 from which condensed wet solvent is discharged to wet solvent header 39 which also receives wet solvent from condensers 32, 36 and P and delivers the combined collections to liquid solvent and water separator Q which discharges separated water to the sewer through pipe 40 and dry solvent to solvent storage tank U by means of pipe 41. Fresh makeup solvent to replace solvent losses in process enters solvent storage tank U through pipe 42. Recovered and makeup solvent then reenter the process by means of solvent pump 43 which sends it through solvent heater V and solvent header 44 to solvent surge tank 20. The solvent extraction cycle is then repeated.

Stripping column T receives heating steam to its calandria through pipe 46 and discharges condensate through pipe 47 to suitable condensate handling traps, receivers, etc. Stripping steam enters through pipe 48 and rises through the stripping column countercurrently to the recovered rice oil to remove the remaining traces of solvent and water vapor which are condensed in condenser 38. The solvent free, crude rice oil is received in oil storage tank X after passing through oil cooler W. It may be sold in the crude state or refined by methods which are not, per se, part of this invention. The crude or refined rice oil is a suitable bran-layer softening agent and may be delivered to tank D for that purpose.

Figure 3:
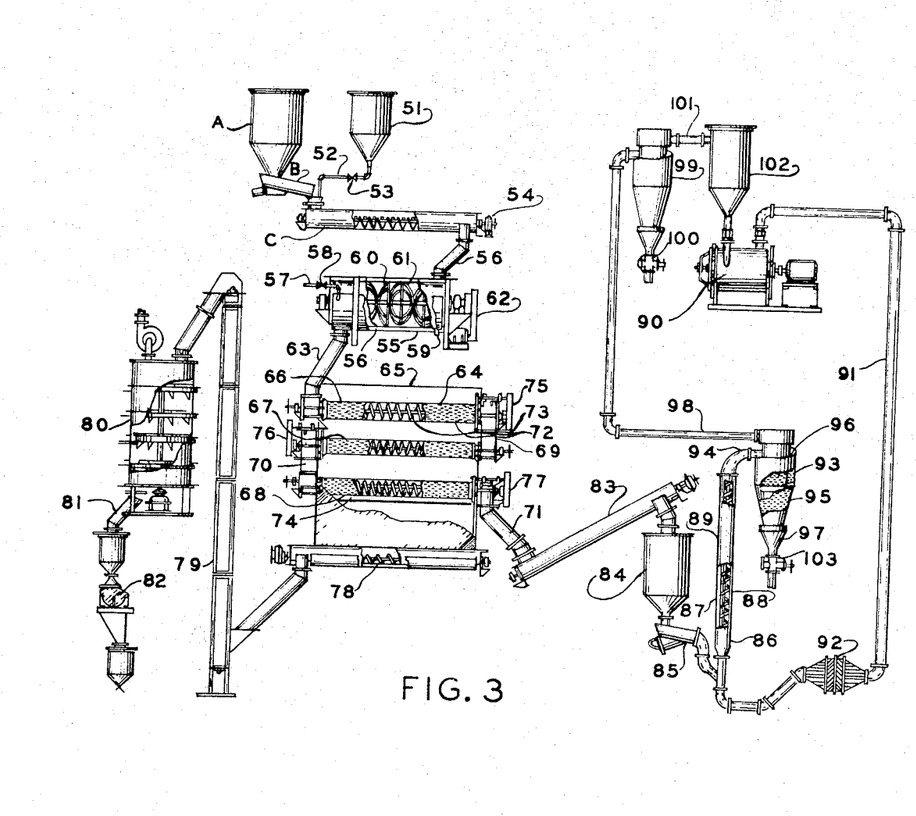
FIG. 3 is a flow diagram illustrating another embodiment of this invention.

In the embodiment illustrated in FIG. 3 bran coat is softened by a liquid bran-coat softening agent added to the brown rice and there is no extraction after milling. FIG. 3 illustrates a storage hopper A from which brown rice, or brown rice admixed with bran removed in preceding stone shellers, is fed by means of a vibrating or screw feeder B into mixing screw conveyor C where it is mixed with relatively small proportion of a liquid bran-coat softening agent from tank 51 delivered by line 52 at a rate of flow regulated by valve 53. Screw conveyor C is constructed as described under FIG. 1 above and is driven by a motor-reducer 54 which is equipped for constant speed or variable speed operation.

Rice containing the bran-coat softening agent is introduced into ribbon mixer designated generally as 55 by a chute 56. In order to accelerate the softening effect of the liquid bran-coat softening agent on the bran coating, the temperature of the rice mixture can be between 90° F. and 140° F. and this temperature may be attained by either preheating the liquid and bran-coat softening agent, or by heating the rice and bran-coat softening agent mixture in ribbon mixer 55 by means of a steam jacket 56 which surrounds a U-trough of the mixer. Steam or hot water is introduced into jacket 56 by line 57 at a rate regulated by valve 58 and water or condensate is discharged from jacket 56 by line 59. Ribbon spirals 60 and 61 in the mixer thoroughly mix the rice with the liquid bran-coat softening agent and operate at speeds which may advantageously be in the range between 40 and 120 r.p.m. although greater or lesser speeds may be used. The ribbons 60 and 61 are illustrated as driven by a motor-reduced assembly 62 which may be of either constant speed or variable speed type.

The rice, now thoroughly wetted mixed with the bran-coat softening agent, is discharged through a discharge spout 63 into the inlet of an upper milling screw conveyor of an assembly of two or more such units designated generally as 64 located within a housing 65.

The assembly of milling conveyors is illustrated as consisting of three such conveyors 66, 67 and 68 supported one above the other in housing 65. The outlet of a preceding unit in this assembly is connected with the inlet of the next succeeding unit in the assembly by chutes 69 and 70 so that brown rice containing liquid bran-coat softening agent entering the inlet of milling conveyor 66 through chute 63 traverses all three of the milling conveyors before being discharged from the outlet of milling conveyor 68 through discharge pipe 71.

Each of the milling screw conveyors includes a cylindrical perforated screen 72 and a screw 73 arranged to impel rice against the cylindrical screen. Screen 72 is arranged to be driven in the same direction as screw 73 but at lower speed and stationary doctor blades 74, shown only in connection with screen 68 for purposes of clarity, are arranged to scrape bran from the outside of screens 66, 67 and 68 as these revolve. The particular apparatus shown illustrates independent drives 75, 76 and 77 mounted outside housing 65 and connected to drive the perforated screens and impelling screws.

Bran passing through the openings in the perforated screen and scraped off the rotating screen by doctor blades 74 drops into the bottom of housing 65 and is removed therefrom by any suitable means illustrated as a screw conveyor 78 and is passed to an elevator 79 which delivers the bran to bran drying means illustrated as a conventional rotating tray dryer 80. The bran-coat softening agent is volatilized from the bran in dryer 80 and dried bran susbtantially free from softening agent is withdrawn from the dryer by discharge spout 81 and is passed through an air lock 82 to storage for use as desired.

Rice containing residual bran is withdrawn from the last milling screw conveyor 68 by discharge spout 71 and is passed by suitable means illustrated as a screw conveyor 83 to surge tank 84. Spout 85 conducts rice and bran from surge tank 84 to a gas lift apparatus designated generally as 86. The gas lift apparatus 86 has a stationary spiral baffle 88 enclosed within a snug fitting cylinder 87 of perforated metal or wire mesh having openings of sufficient size to permit the passage of bran and to retain rice. The cylinder 87 is contained in a housing 89.

A current of air from blower 90 is conducted through pipe 91 and temperature regulating and drying apparatus 92 into the lower part of the gas lift device 86. This arrangement allows any bran or polishings which pass through the perforated cylinder to be collected in the upward air current and carried over into cyclone collector-separator designated generally as 93 together with the rice which is also carried upward through the spiral path within the perforated cylinder 87 and into the cyclone collector-separator through a spirally arranged inlet duct 94.

The rice and fines thus joined then swirl in a circular path within the circular annulus formed between the outer shell of the cyclone which has a roughened inner surface 95 and a stationary inner cylinder 96. The latter preferably is formed from wire cloth of about 14 by 18 mesh per linear inch, or finer mesh if a high luster is desired on the polished rice. The rice and also the remaining fines which do not pass through the inner perforated cylinder 96 pass down the annular space to the bottom of the cyclone where rice is deposited in the collecting hopper 97 and the fines are entrained in a reverse air current which now passes upward through cylinder 96 and enters the outlet duct 98 which is arranged to carry the fines to a second cyclone collector 99 where the bran and polishings are recovered and may be withdrawn through valve 100 to any further separating steps desired.

The gaseous effluent from the cyclone collector 99 may be discharged through outlet duct 101 to the atmosphere, with or without being filtered through a dust filter 102. However, to conserve heat and reduce the power requirements of the blower 90, it is usually desirable to use a closed circuit in which the temperature and humidity of the drying air may be closely controlled by passage of the air stream from blower 90 through duct 91 to the apparatus 92 which may heat, cool or dehumidify the air to the required extent. The conditioned air from the apparatus 92 then passes to the gas lift device 86 and the cycle is repeated.

The transporting gas stream may be heated or cooled air, dehumidified air which has drying capacity at ambient or elevated temperatures, or a flue gas mixture suitable for drying purposes. The gas lift device and the cyclone collectors function as dryers, separators for rice and bran from the preceding milling operations and combination brushes and separators for polished rice and polishings. Velocity of the transporting gas stream must be controlled to allow the deposit of rice in collecting hopper 97 and to carry out the bran through duct 98.

Finished rice in the collecting hopper 97 is withdrawn through valve 103 and may be sent to storage by any suitable conveying means and may be sacked or packaged as finished products. The latter operations are conventional and are no part of the present invention.

The yields of products are substantially quantitative except for inconsequential losses of bran dust and polishings in the dryer dust collection systems for the rice and bran fractions, respectively. For each 100 pounds of brown rice averaging 12 percent moisture by weight, the yields which vary with the degree of milling, are as follows:

| | Percent |
|---|---|
| Rice bran and polishings | 4.5 to 10.5 |
| Clean rice | 95.5 to 89.5 |

The weights of the residues from added bran-layer softening agents have been neglected in the above figures. These weights will range from zero to as much as 1.0% of the weight of the brown rice milled, in the case of an aqueous agent or 5 percent in the case of a non-aqueous agent. For instance, if ammonium bicarbonate were used as the bran-coat softening agent it would all volatilize at 140° F. However, if a vegetable oil were added in the maximum proportion of 5 percent by weight, and was not removed by solvent extraction, this weight percentage would be added to the 4.5 to 10.5 percent range in the bran yield above stated and the vegetable oil would increase the nutritive value of the bran as stock feed. Normally, however, such residues from the use of bran-coat softening agents, whether water soluble or oil soluble, need not exceed 1 percent of the weight of the original brown rice.

While in the preceding examples descriptions have been furnished of suitable apparatus such as milling screw conveyors, desolventizers, bran dryers and milled rice polishing apparatus, it will be understood that equivalents of such apparatus may be substituted for those shown in the process sequence. To illustrate these equivalents a partial discussion is given below. It will be understood that some of the equipment equivalents listed do not as readily lend themselves to a continuous process, but semi-continuous and batch operations which are functional equivalents are also contemplated.

For example, instead of the continuous milling screw conveyors described, vertical screw arrangements of the same type apparatus may be used, as well as conical mixers lined with abrasive surfaces. Rotating cylindrical vessels equipped with lifters and internal baffles fabricated from moderately abrasive material, certain types of modified pug mills, modified cone mills and even an adaption of the conventional rice huller machines are contemplated. For the screw conveyor desolventizer M in FIG. 2 stationary column type desolventizers may be substituted, as well as hearth type desolventizers, moving bed fluidized and countercurrent tower types, vacuum desolventizers and numerous adaptions and combinations of desolventizer types which operate under vacuum, at atmospheric pressure, or under pressures higher than atmospheric. The desolventizing medium may be saturated or superheated steam, heated air or inert gases or flue gases. Bran dryers other than the types shown also may be used and among these types are rotary drum dryers, vacuum dryers or rotary cylindrical or tumbling conical type vacuum drum dryers, fluidized dryers, continuous belt tunnel dryers and tray dryers. Brush machines, rotary tumblers, fluidized bed polishing apparatus, etc., used with the usual aspirators and collectors for separating the polishings from the rice may be substituted for the fluidized rice polishing and collecting apparatus shown in FIG. 3. It is believed that the above descriptions of the several embodiments of the methods, materials, proportions and apparatus of the present invention are sufficient that it is apparent that the same may be widely used without essential departure therefrom. Also that all such modifications and departures are contemplated as falling within the scope of the appended claims.

The invention having been described, what is claimed is:

1. A process for milling rice comprising intimately mixing with brown rice a liquid bran-coat softening agent in an amount of more than 0.25% of the weight of the rice, but whose free water content is not in excess of 1.0% of the weight of the rice; holding the rice sufficiently long for the bran-coat softening agent to soften the bran layers but insufficient for the bran-coat softening agent to substantially affect the underlying endosperm of the rice; and milling the rice in presence of the bran-coat softening agent and under sufficient pressure on the rice to mechanically remove the bran layers.

2. The process of claim 1 wherein the bran-coat softening agent includes a non-toxic oil.

3. The process of claim 1 wherein the bran-coat softening agent is separated from the resulting bran and milled rice.

4. The process of claim 3 wherein at least part of the liquid bran-coat softening agent is extracted from the bran and milled rice with an organic solvent, and the solvent is separated from the bran and milled rice.

5. The process of claim 1 wherein the bran and rice are extracted after the milling step with a volatile solvent effective to extract fatty components from the bran and milled rice; the solvent containing the fatty components is separated from the bran and milled rice; rice oil is separated from the solvent; and the residual solvent is evaporated from the bran and milled rice.

6. The process of claim 5 wherein the solvent contains water in substantially azeotropic proportions as a constant boiling mixture.

7. The process of claim 5 wherein at least part of the liquid bran-coat softening material is extracted from bran and milled rice with a volatile organic solvent.

8. The process of claim 1 wherein a substantial proportion of bran is withdrawn from the milling step; rice mixed with residual bran is separately withdrawn from the milling step; the withdrawn mixed rice and residual bran and the withdrawn bran are separately extracted with a volatile solvent sufficient to effect removal of fatty components after withdrawal from the milling step; the solvent is separated from the bran and from the mixed rice and residual bran; and rice oil is separated from the solvent.

9. The process of claim 1 wherein the liquid bran-coat softening agent is selected from a group consisting of non-toxic oils; esters of glycerol, propylene glycol, polypropylene glycol, and sorbitol with fatty acids; soaps of higher fatty acids; propylene glycol; polypropylene glycol; aqueous solutions of hydroxides and carbonates of ammonium and alkali metals; aqueous solutions of neutral salts; dilute aqueous solutions of hydrochloric, sulfuric, phosphoric and citric acids, and mixtures thereof.

10. The process of claim 5 wherein the liquid bran-coat softening agent is a material selected from the group consisting of non-toxic oils; esters of glycerol, propylene glycol, polypropylene glycol, and sorbitol with fatty acids; soaps of higher fatty acids; propylene glycol; polypropylene glycol; aqueous solutions of hydroxides and carbonates of ammonium and alkali metals; aqueous solutions of non-toxic neutral salts of ammonium and alkali metals; dilute aqueous solutions of hydrochloric, sulfuric, phosphoric and citric acids, and mixtures thereof.

11. The process of claim 10 wherein the bran-coat softening agent includes vegetable oil.

12. The process of claim 11 wherein the vegetable oil is rice oil.

13. The process of claim 10 wherein the bran-coat softening agent includes propylene glycol.

14. The process of claim 10 wherein the bran-coat softening agent includes polypropylene glycol.

15. The process of claim 9 wherein the bran-coat softening agent is an aqueous emulsion of a fatty acid soap.

16. The process of claim 9 wherein the bran-coat softening agent is an aqueous solution of ammonium carbonate.

17. The process of claim 16 wherein the ammonium carbonate is volatilized from the bran and milled rice.

18. A process for milling rice comprising intimately mixing with brown rice in an amount of more than 0.25% of the weight of the rice, but whose free water content is not in excess of 1.0% of the weight of the rice, an aqueous bran-coat softening agent containing sufficient active components to soften the bran; holding the rice sufficiently long for the bran-coat softening agent to soften the bran but insufficient for the bran-coat softening agent to substantially affect the endosperm of the rice kernels; milling the rice in the presence of the bran-coat softening agent; separately withdrawing substantial proportions of the bran during the milling step; separately withdrawing rice mixed with residual bran from the milling step; and separately volatilizing the bran-coat softening agent from the bran and from the rice mixed with residual bran.

19. The process of claim 18 wherein the bran-coat softening agent is an aqueous solution of ammonium carbonate.

20. A process for milling rice mixing with brown rice in an amount of more than 0.25% of the weight of the rice, but whose free water content is not in excess of 1.0% of the weight of the rice, an aqueous bran-coat softening agent containing sufficient active components to soften the bran; holding the rice sufficiently long for the bran-coat softening agent to soften the bran but insufficient for the bran-coat softening agent to substantially affect the endosperm of the rice kernels; milling the rice in the presence of the bran-coat softening agent; separately withdrawing substantial proportions of the bran during the milling step; separately drying the separately withdrawn bran at an elevated temperature to remove major proportions of the moisture and the bran-coat softening agent therefrom; separately withdrawing the rice mixed with the residual bran from the milling step; subjecting the separately withdrawn mixture of milled rice and residual bran to a combined aspirating and polishing operation to separate the residual bran from the milled rice kernels; and volatilizing the bran-coat softening agent from the milled rice mixed with residual bran to separately recover the polished milled rice and bran.

21. The process of claim 1 wherein the bran-coat softening agent is selected from the group consisting of viscous aqueous solutions, emulsions, and gels.

22. A process for milling rice comprising intimately mixing a substantially non-aqueous bran-coat softening agent with brown rice in quantity sufficient to soften the bran-coat on the kernels of brown rice, said agent being in an amount of more than about 0.25% of the weight of the rice; holding the rice for a period of time sufficient for the non-aqueous bran-coat softening agent to soften the bran; and milling bran from the brown rice in presence of the non-aqueous bran-coat softening agent.

23. The process of claim 22 wherein the substantially non-aqueous bran-coat softening agent is selected from the group consisting of the preponderantly lipophilic non-toxic oils; esters of glycerol, propylene glycol, polypropylene glycol, and sorbitol with fatty acids; soaps of higher fatty acids, and mixtures thereof with brown rice in quantity sufficient to soften the bran-coat on kernels of the rice.

24. The process of claim 22 wherein the substantially non-aqueous bran-coat softening agent is preponderantly lipophilic in character and is recovered from the milled rice and bran by extraction with a volatile organic solvent.

25. The process of claim 22 wherein the proportion of substantially non-aqueous bran-coat softening agent mixed with the brown rice is in the range from 0.25 to 5 percent of the weight of the rice.

26. The process of claim 22 wherein the substantially non-aqueous bran-coat softening agent is extracted from the bran and milled rice with an organic solvent; the solvent is separated from bran and milled rice, and the bran-coat softening agent is recovered from the solvent and re-used to soften the bran-coat on unmilled brown rice.

27. The process of claim 22 wherein after milling the resulting bran and rice are extracted with a volatile organic solvent effective to extract fatty components from the bran and rice; the solvent, containing such fatty components, is separated from the bran and rice; rice oil is separated from the solvent; and the residual solvent is evaporated from the bran and milled rice.

28. The process of claim 27 wherein the volatile organic solvent contains water in substantially azeotropic proportions as a constant boiling mixture.

29. The process of claim 26 wherein the bran-softening agent is a vegetable oil.

30. The process of claim 29 wherein the vegetable oil is rice oil.

31. The process of claim 27 wherein a substantial proportion of bran is separated from the milled rice and bran mixture during the solvent extraction step; rice mixed with residual bran is separately withdrawn from the solvent extraction step; the extracted bran on the one hand and the milled rice and residual bran mixture on the other hand are separately recovered from the solvent; and rice oil is recovered from the solvent.

32. The process of claim 27 wherein the combined milled rice and bran fractions are subjected to a desolventizing step to remove the residual solvent.

33. A process for milling rice comprising intimately mixing a substantially non-aqueous bran-coat softening agent with brown rice in the proportion of from 0.25 to 5 percent of the weight of the rice; holding the treated rice for a period of time sufficient for the non-aqueous bran-coat softening agent to soften the bran-coat of the rice kernels; milling the bran from the brown rice; separately collecting a major bran fraction on the one hand, and a mixture of the milled rice and residual bran on the other hand; drying the major bran fraction at an elevated temperature to remove the major portion of the moisture and the bran-coat softening agent; subjecting the mixture of milled rice and residual bran to a combined aspirating and polishing operation to separate the residual bran from the milled rice kernels; and separately recovering the polished milled rice and the residual bran.

References Cited

UNITED STATES PATENTS

| | | |
|---|---|---|
| 2,007,693 | 7/1935 | Rüter et al. |
| 2,232,697 | 2/1941 | Earle _____________ 146—221.9 |
| 2,329,402 | 9/1943 | Logue _____________ 143—221.9 |
| 2,530,272 | 11/1950 | Thrasher. |
| 2,829,055 | 4/1958 | Ozai-Durrani. |

FOREIGN PATENTS 186,603　11/1923　Great Britain.

RAYMOND N. JONES, *Primary Examiner.*